May 11, 1926.
F. J. LAHER
1,584,456
VEHICLE BUMPER AND LUGGAGE CARRIER SUPPORT
Filed Nov. 24, 1925
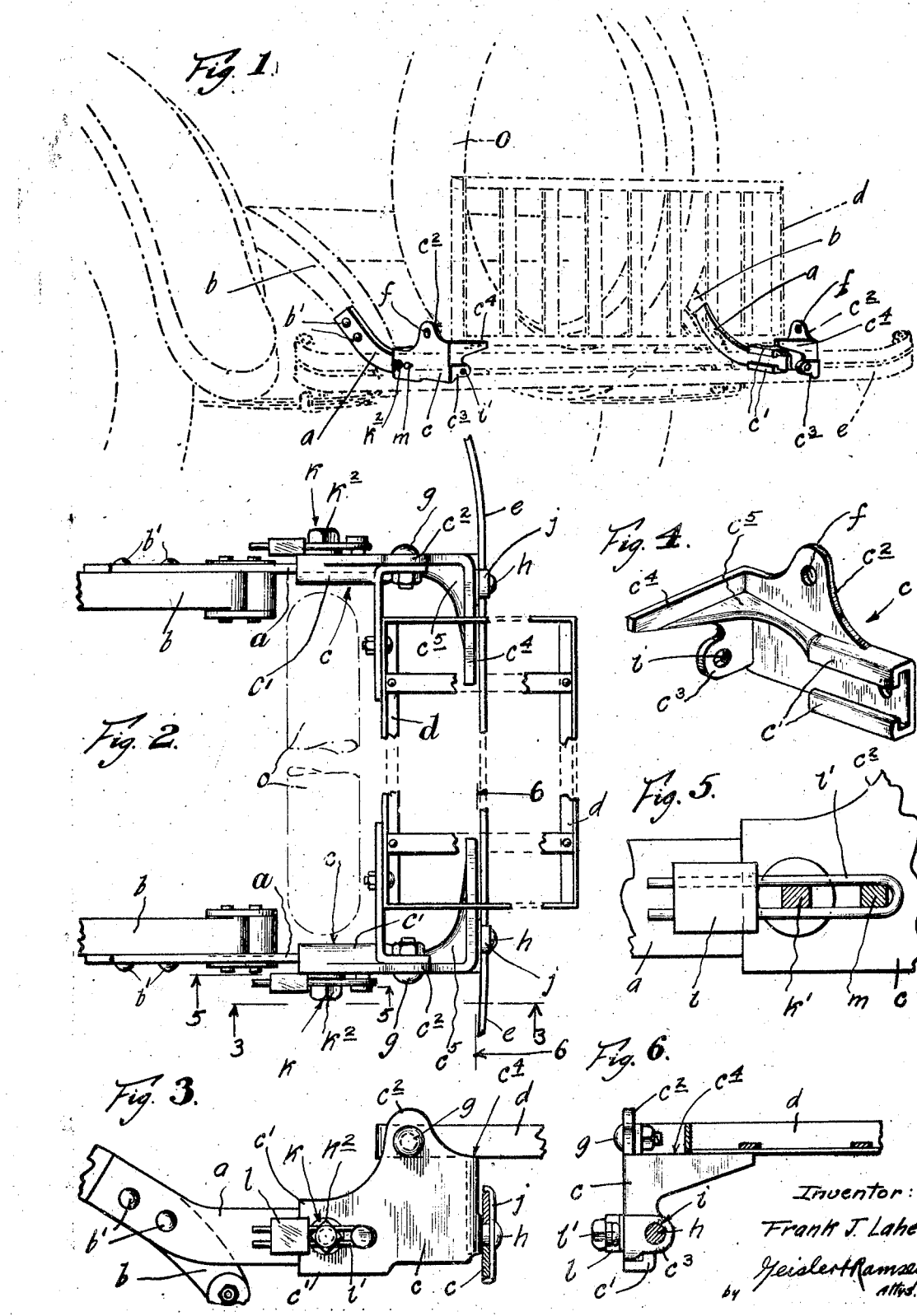
Inventor:
Frank J. Laher
by Geisler+Ramsey
Attys.

Patented May 11, 1926.

1,584,456

UNITED STATES PATENT OFFICE.

FRANK J. LAHER, OF PORTLAND, OREGON.

VEHICLE BUMPER AND LUGGAGE-CARRIER SUPPORT.

Application filed November 24, 1925. Serial No. 71,153.

The object of my invention is to provide an attachment for motor vehicles which attachment comprises a bumper, a luggage carrier, and a supporting bracket therefor, said bracket being arranged to support said bumper and said carrier in fixed relationship with each other upon one end of said motor vehicle, said attachment being adjustable as a body towards and from that end of the motor vehicle.

A further and incidental object of my invention is to provide a bracket in attachment of this character, which bracket is adapted to provide a sturdy support for the bumper and is arranged pivotally to support a luggage carrier between said bumper and the end of said motor vehicle, said bracket further being provided with means, spaced from said pivot, for supporting the free end of said pivoted luggage carrier when the latter is arranged in horizontal or luggage carrying position.

I attain these objects by providing a pair of arms adapted to be secured to and in parallel relation with, the ends of the frame sides of the vehicle. Upon each of said arms, I mount a bracket, the body of each bracket being provided with upstanding web portions adapted for having a horizontal luggage carrier pivotally fastened thereto, with another web portion adapted for having an end of a bumper fastened thereto and a third web portion arranged inwardly of the bumper supporting web and below the luggage carrier supporting web, which third web portion is adapted to support the luggage carrier when arranged in horizontal or luggage carrying position. In this manner the luggage carrier is independent of the bumper for support, but at the same time is carried by the same member and is adjustable with said bumper relatively towards and from that end of the vehicle.

A further and incidental object of my invention is to provide means upon one or both of said brackets by which the latter can be locked in set position.

This arrangement is particularly desirable when the combined bumper and luggage carrier attachment is arranged at the rear end of a vehicle, exteriorly of the extra tire rack and the tire carried thereby, for the reason that the attachment can be moved inwardly along the supporting arms and arranged in abutment with said spare tire to prevent the latter from being removed and stolen.

The details of my invention and their relative arrangement are hereinafter described in greater detail with reference to the accompanying drawings in which:

Fig. 1 is a fragmentary perspective view of the rear end of an automobile, showing my improved attachment in place thereon; the end of the automobile, the frame sides, spare tire, bumper and luggage carrier are shown in dotted outline and the supporting arms and bracket slidably mounted thereon being shown in full lines;

Fig. 2 is a broken plan view of the rear ends of the automobile frame sides with my improved attachment carried thereby;

Fig. 3 is substantially a side elevation of my attachment taken on the line 3—3 in Fig. 2;

Fig. 4 is a perspective view of one of the brackets which slidably support the luggage carrier and bumper upon the parallel arms;

Fig. 5 is an enlarged fragmentary view taken on the line 5—5 of Fig. 2, showing how a lock is adapted to hold the fastening set-screw in place; and Fig. 6 is a fragmentary section taken on the line 6—6 of Fig. 2.

My combined bumper and luggage carrier attachment comprises arms $a$ adapted to be fastened to the ends of the frame sides $b$ of a motor vehicle, said arms being fastened by rivets or bolts $b'$. Said arms are of uniform thickness and are arranged in parallel relationship with each other and with the frame sides.

Upon each of said arms a bracket $c$ is mounted, said bracket having a body comprising a sleeve portion $c'$ and a web portion $c^2$, which is adapted to support one end of a luggage carrier $d$, a web portion $c^3$, which is adapted to support one end of a bumper $e$ and a laterally turned flange $c^4$, which is arranged inwardly of said web portions $c^3$ and below the hole $f$ in the web portion $c^2$.

Through said hole $f$ in the web portion $c^2$, on each of said brackets, I mount bolts $g$ for pivotally supporting the luggage carrier $d$. Connecting said laterally turned flange $c^4$ and the main body of said bracket is a connecting web $c^5$, which is adapted to prevent the bracket from becoming distorted.

That is, said bracket consists of two flat sections arranged normal to each other, one of said sections carrying the sleeve $c'$ and the web portions $c^2$, and the other flat section carrying the web portion $c^3$ for supporting the bumper, and the inturned flange $c^4$ for supporting the luggage carrier in extended position. Said flat sections are connected, braced and held in angular position by the web $c^5$, which is thus adapted to strengthen said bracket so as to withstand the shocks to which said bracket is subjected through the bumper $e$. Said web $c^5$ also serves to strengthen the flange $c^4$, which supports the free end of the pivoted luggage carrier $d$ when arranged in horizontal or load supporting position. Bolts $h$ extend through the hole $i$ in the web $c^3$ of the bracket and, together with clips $j$, fasten the bumper to the brackets.

Each of said brackets is slidably mounted upon its supporting arm $a$, said arm being partially encompassed by the sleeve portion $c'$ of said bracket. Said arms are arranged parallel to each other and are of substantially uniform cross-section. Said sleeves are proportioned to be slightly larger than the arms so that they have a free sliding fit on the latter.

I provide means, such as the set-screws $k$ which are threaded into said brackets and which engage the arms $a$ to hold the brackets in set position. In this manner the combined bumper and luggage carrier attachment can be arranged upon the arms so as to abut against the lower edge of the rear tire, as shown in Fig. 1, and fastened to prevent said tire from being removed from its rack, and stolen.

To prevent the set-screws $k$ from being backed off and the attachment moved outwardly, I provide fastening means such as the lock $l$ upon either or both of said set-screws. To accommodate said lock the shanks $k'$ of the said set-screws are squared, said squared portion being substantially smaller in diameter than the head $k^2$ of said set-screw, as shown in Fig. 3. In alinement with said set-screw and adjacent thereto, I provide a protuberance $m$ formed on the side of the bracket so that the hasp $l'$ of the lock $l$ can be fitted tightly about the shank of the set-screw $k$ and the protuberance so as to prevent the rotation of said set-screw.

The tire $o$ commonly is mounted on its rack so that its bottom edge extends slightly below the bumper, but the latter is spaced a relatively great distance laterally from said tire to permit the latter to be unseated laterally from its rack.

By arranging a luggage carrier and bumper upon a common bracket as shown, and mounting said bracket so as to be slidable upon two arms, I am able easily to shift said bumper and luggage carrier to a position in abutment with said tire, and then by fastening and locking said bracket to its supporting arms, said parts serve as bars to prevent the lateral unseating of said tire.

The luggage carrier $d$ in vertical position is arranged behind the bumper, so as to be protected by the latter, but at the same time covers the lower part of the tire and its rack to protect the latter. When the luggage carrier is arranged in horizontal position the flange $c^4$ supports the free end of said pivoted luggage carrier which, being slightly above the bumper as shown in Fig. 3, permits said luggage carrier to overlie the latter although not resting upon same.

My improved bracket thus serves to support said bumper and said luggage carrier independently of each other, and at the same time provides a common support for both so as to permit the same to be shifted as a body towards the end of the motor vehicle.

I claim:

1. In means for supporting an auxiliary device upon one end of the side frames of a vehicle, a bracket consisting of two flat sections arranged normal to each other, one thereof provided with a sleeve for mounting on a supporting arm, each of said sections being provided with fastening means for said auxiliary device.

2. In means for supporting an auxiliary device upon one end of the side frames of a vehicle, a bracket consisting of two flat sections arranged normal to each other, one thereof provided with a sleeve for mounting on a supporting arm, each of said sections being provided with fastening means for said auxiliary device, a web connecting said sections, one of said sections being provided with a perforation below said web and the other with the perforation above said web.

3. A combined bumper and luggage carrier attachment for vehicles, comprising a pair of arms adapted to be secured to, and in parallel relation with the rear ends of the frame sides of the vehicle; a bracket slidably mounted upon each of said arms, the body of each bracket being provided with web portions adapted for having a luggage carrier fastened thereto and with another web portion adapted for having an end of a bumper fastened thereto.

4. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier pivotally fastened thereto and with another web portion adapted for having an end of a bumper fastened thereto.

5. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier fastened thereto and with another web portion adapted for having an end of a bumper fastened thereto, said bracket also having a laterally turned flange, said flange being arranged inwardly of the web portion adapted for supporting a bumper and being arranged below the support for said luggage carrier.

6. A combined bumper and luggage carrier attachment for vehicles, comprising a pair of arms adapted to be secured to, and in parallel relation with the rear ends of the frame sides of the vehicle, a bracket slidably mounted upon each of said arms, means carried by one of said brackets and adapted to engage the arm upon which said bracket is slidably mounted.

7. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier fastened thereto and with another web portion adapted for having an end of a bumper fastened thereto and means carried by one of said brackets and adapted to engage the arm upon which said bracket is slidably mounted.

8. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier fastened thereto and with another web portion adapted for having an end of a bumper fastened thereto, an adjustable set-screw carried by one of said brackets and adapted to engage the arm upon which said bracket is slidably mounted, a projection arranged adjacent said set-screw, said screw being provided with portions adapted to be engaged by holding means passed over said projection and set-screw, said portions being formed to prevent the rotation of said screw when the holding means are in place.

9. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier fastened thereto and with another web portion adapted for having an end of a bumper fastened thereto, an adjustable set-screw carried by one of said brackets and adapted to engage the arm upon which said bracket is slidably mounted, a projection arranged adjacent said set-screw, said screw being provided with flat sided portions adapted to be engaged by holding means passed over said projection and set-screw, said portions being formed to prevent the rotation of said screw when the holding means are in place.

10. A combined bumper and luggage carrier attachment for vehicles, comprising a pair of arms adapted to be secured to, and in parallel relation with the rear ends of the frame sides of the vehicle, a bracket slidably mounted upon each of said arms, the body of each bracket being provided with web portions adapted for having a luggage carrier fastened thereto and with another web portion adapted for having an end of a bumper fastened thereto, said bracket also having a laterally turned flange, said flange being arranged inwardly of the web portion adapted for supporting a bumper and being arranged below the support for said luggage carrier, an adjustable set-screw carried by one of said brackets and adapted to engage the arm upon which said bracket is slidably mounted, a projection arranged adjacent said set-screw, said screw being provided with flat sided portions adapted to be engaged by holding means passed over said projection and set-screw, said portions being formed to prevent the rotation of said screw when the holding means are in place.

11. A combined bumper and luggage carrier attachment for vehicles, comprising a pair of arms adapted to be secured to, and in parallel relation, with ends of the frame sides of a vehicle, a frame-like support slidably mounted on each of said arms, said frame-like support adapted to carry a bumper at one end thereof and a luggage carrier at one side thereof, said frame support and the devices carried thereby being adapted to be adjusted as a body toward and from the end of said vehicle.

FRANK J. LAHER.